April 10, 1951  C. L. EKSERGIAN  2,548,596
RAIL CAR TRUCK
Filed Dec. 23, 1944  6 Sheets-Sheet 1

INVENTOR
CAROLUS L. EKSERGIAN
BY John P. Tarbox
ATTORNEY

April 10, 1951  C. L. EKSERGIAN  2,548,596
RAIL CAR TRUCK
Filed Dec. 23, 1944  6 Sheets-Sheet 2
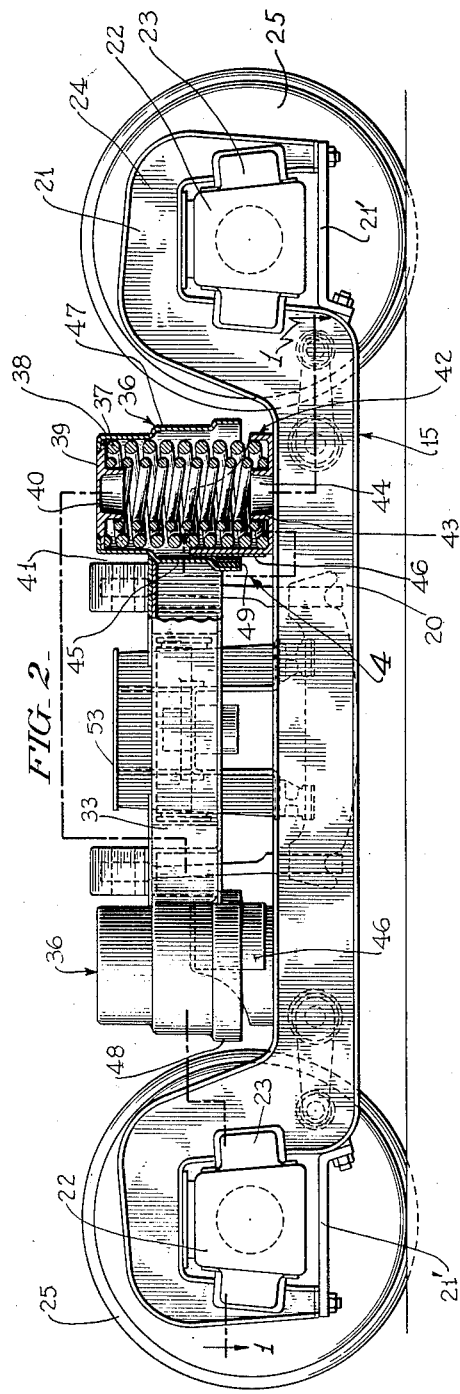
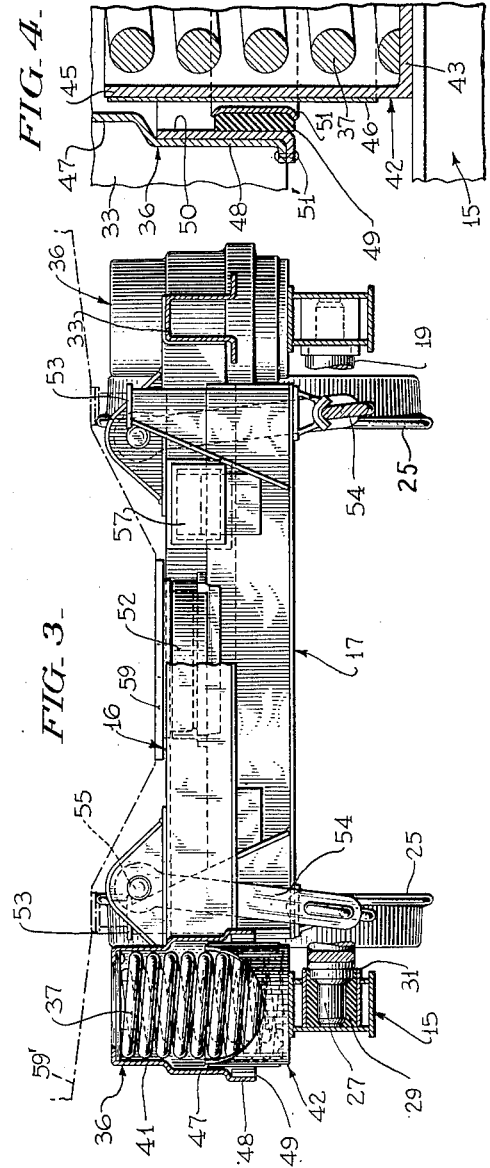
INVENTOR
CAROLUS L. EKSERGIAN
BY John P. Tarbox
ATTORNEY

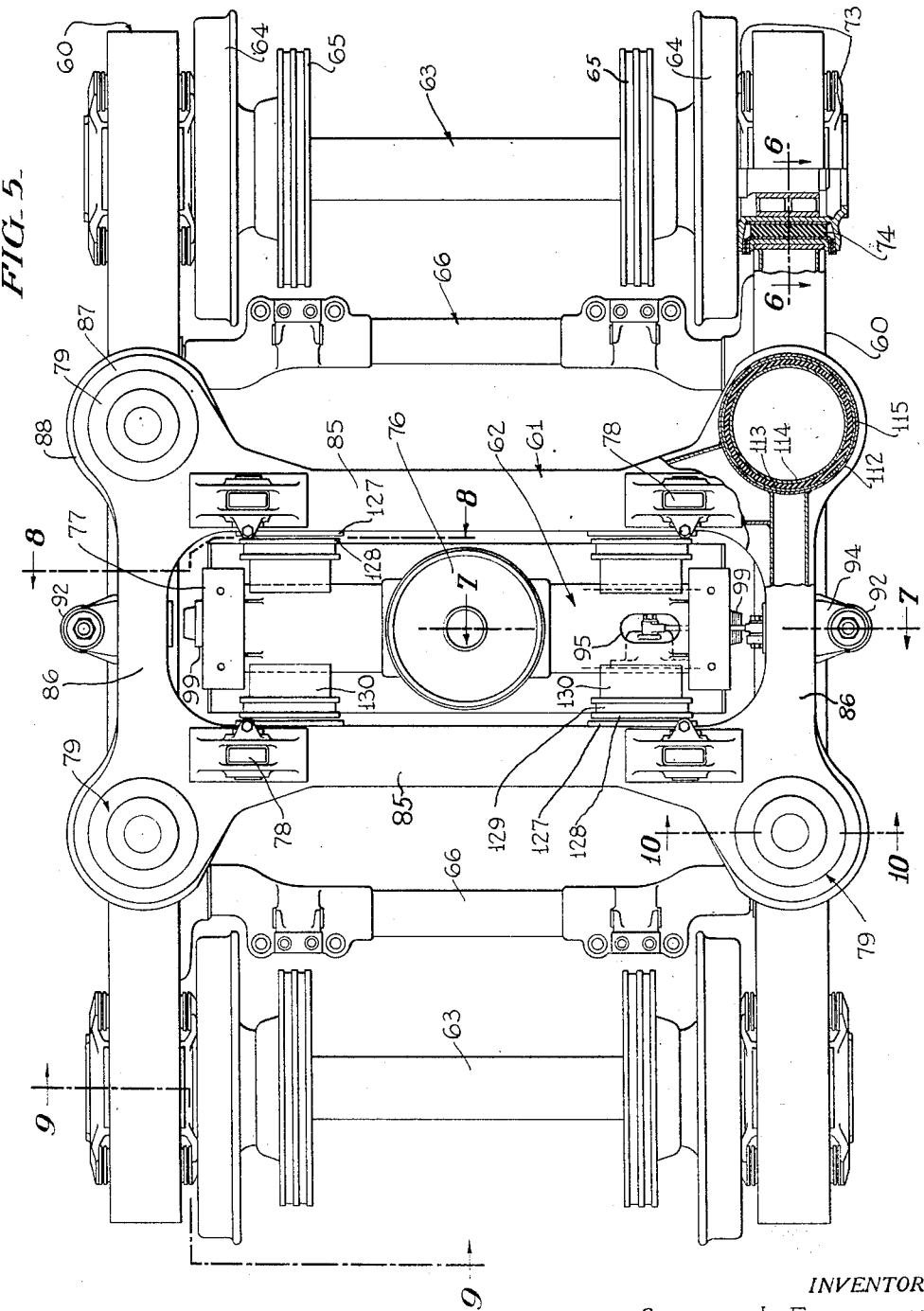

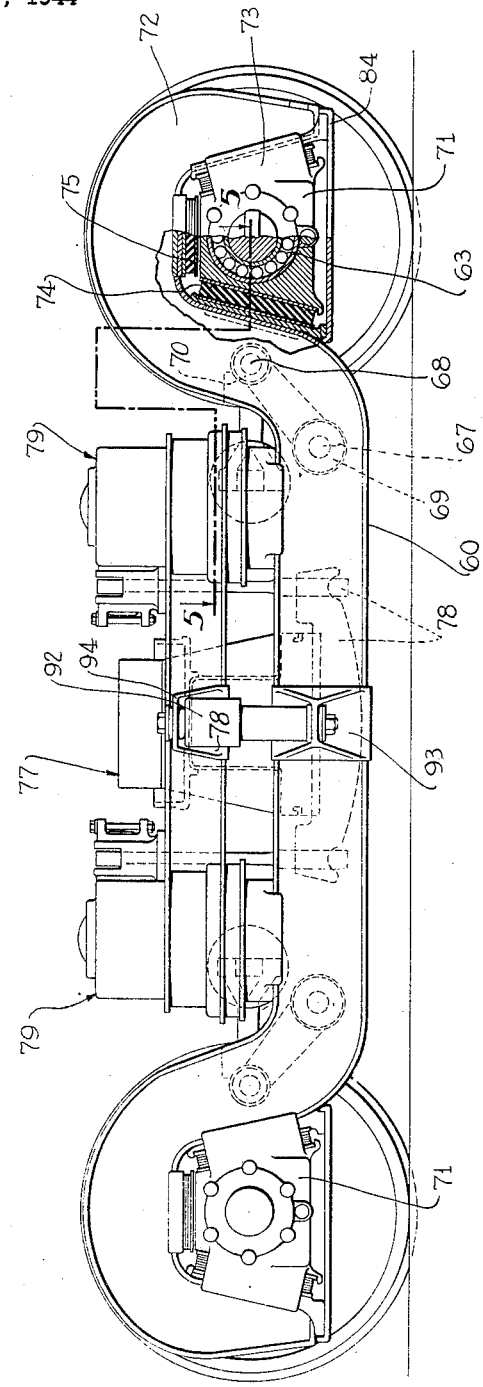

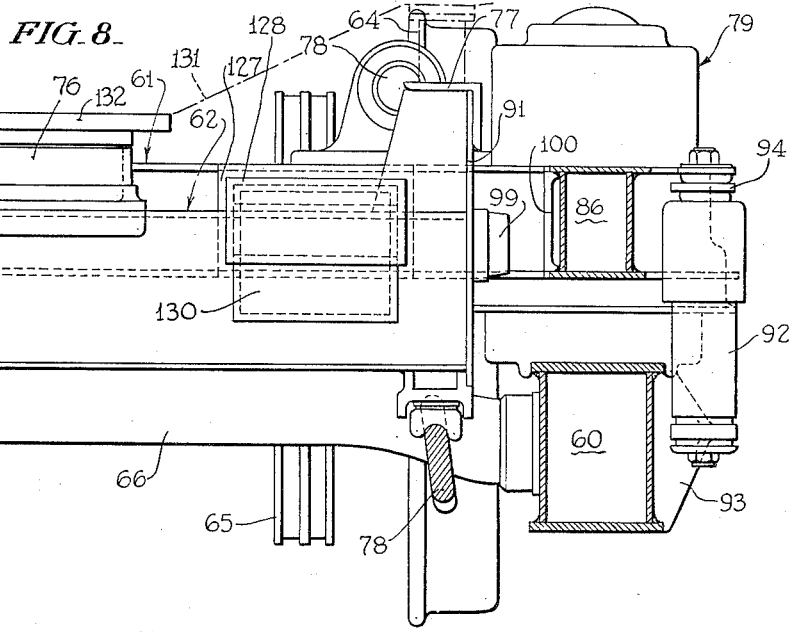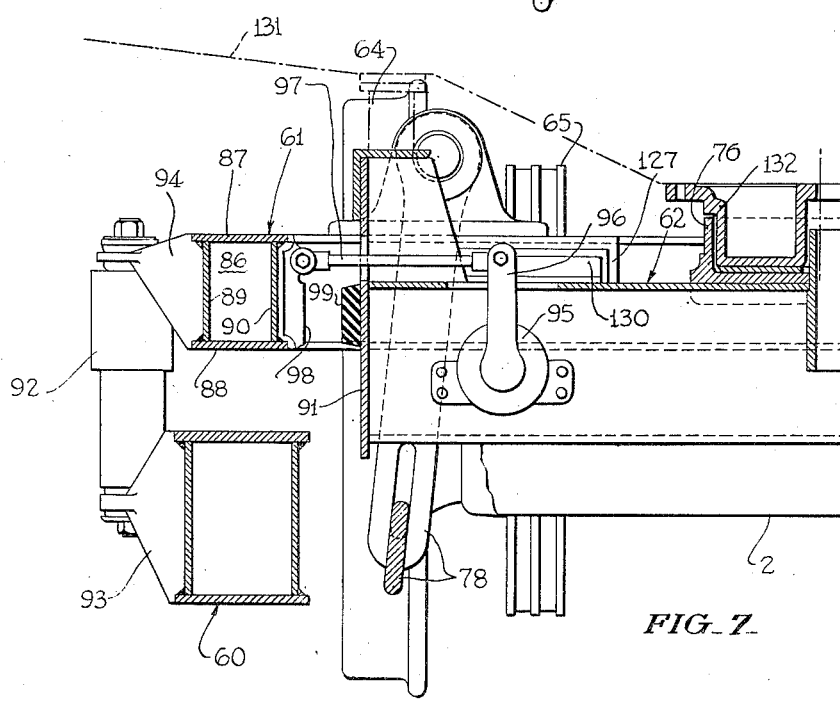

April 10, 1951  C. L. EKSERGIAN  2,548,596
RAIL CAR TRUCK

Filed Dec. 23, 1944  6 Sheets-Sheet 6

INVENTOR
CAROLUS L. EKSERGIAN
BY John P. Tarbox
ATTORNEY

Patented Apr. 10, 1951

2,548,596

UNITED STATES PATENT OFFICE 2,548,596

RAIL CAR TRUCK

Carolus L. Eksergian, Detroit, Mich., assignor to The Budd Company, Philadelphia, Pa., a corporation of Pennsylvania Application December 23, 1944, Serial No. 569,492

2 Claims. (Cl. 105—208.1)

The invention relates to rail car trucks and more specifically to that simplified form of truck in which the side frames are given an equalizer function and cross frames are so articulated thereto as to preserve their proper relative positions in the horizontal plane without substantial impairment of this equalizer action. The type as such might be called an equalizer frame truck.

Trucks of the indicated type are designed for the purpose of simplifying the construction and for reducing the weight as compared with trucks having a rigid frame which extends not only across the width but also over the entire length of the truck and engages the ends of the axles.

The outstanding object of the invention is to further simplify the construction and to reduce the weight of trucks of the indicated type without impairing in any way but rather improving the safety of operation, the durability, the riding qualities and all other characterisitcs which are necessary or desirable in a railcar truck and which are well known to those skilled in this art.

Among the objects of the invention is also the improvement or further development of the truck belonging to the indicated title, which is disclosed in the inventor's application Serial No. 509,957, filed November 12, 1943, Railway Truck, now abandoned, this application being a continuation-in-part of said earlier filed application.

One of the most important structural arrangements contributing to the attainment of the objects of the invention is the constitution of the transverse frame or transom the main means for connecting and holding the side frames or equalizers transversely and longitudinally together, and providing in association with this arrangement means for transmitting horizontal forces, especially in a longitudinal direction, between the transverse frames and the side frames.

The invention contemplates the use of unitary devices adapted and arranged for resiliently supporting the transverse frame or transom on and for connecting it to the side frames or equalizers and for transmitting the horizontal forces.

Such devices may consist of coil springs arranged in telescoping housings in which the parts of the housings are securely fastened to the side frames and to the transverse frame, respectively, and serve for transmitting all forces in horizontal planes.

A further feature of the invention resides in the use of resilient cushions between the telescoping parts of the spring housings so as to resiliently transmit the horizontal forces and eliminate the transmission of vibrations.

So as to avoid heavy eccentric forces, the invention contemplates the arrangement of the axles supporting the side frames in a plane close to the plane of contact between the parts of the aforesaid telescoping housings for the springs.

Another feature of the invention resides generally in the suspension of the transverse frame or transom on the axle supported framework, such as for instance two separate side frames or equalizers, in combination with the suspension of the bolster on the transom in such a manner that the transom has a certain amount of freedom with respect to the axle supported framework to swivel about horizontal axes whereas the bolster is supported by the transom or transverse frame so that it may move forth and back in transverse direction but is prevented from swiveling about horizontal axes and maintains a fixed relationship to the body of the car which it supports. This arrangement eliminates the so-called galloping, pitching or rolling of the frame of many now customary trucks which sometimes makes riding in a railcar quite uncomfortable.

The aforesaid and further features, details, objects and advantages of the invention will become more easily understood from the following description of the embodiment illustrated in the attached drawings.

In the drawings:

Figure 2 is a side elevation of the same truck, one of the spring devices being shown in section;

Figure 3 is a transverse section along line 3—3 of Figure 1;

Figure 4 is a sectional fragmentary view on a larger scale of the portion of one of the spring devices surrounded by line 4 in Figure 2;

Figure 5 is a plan view of a truck built according to another embodiment of the invention, partly in section substantially along line 5—5 of Figure 6;

Figure 6 is a side elevation of the truck shown in Figure 5, partly in section along line 6—6 of Figure 5;

Figures 7, 8, 9 and 10 are transverse sections or end elevations respectively taken substantially along the correspondingly numbered lines of Figure 5.

Figure 1:
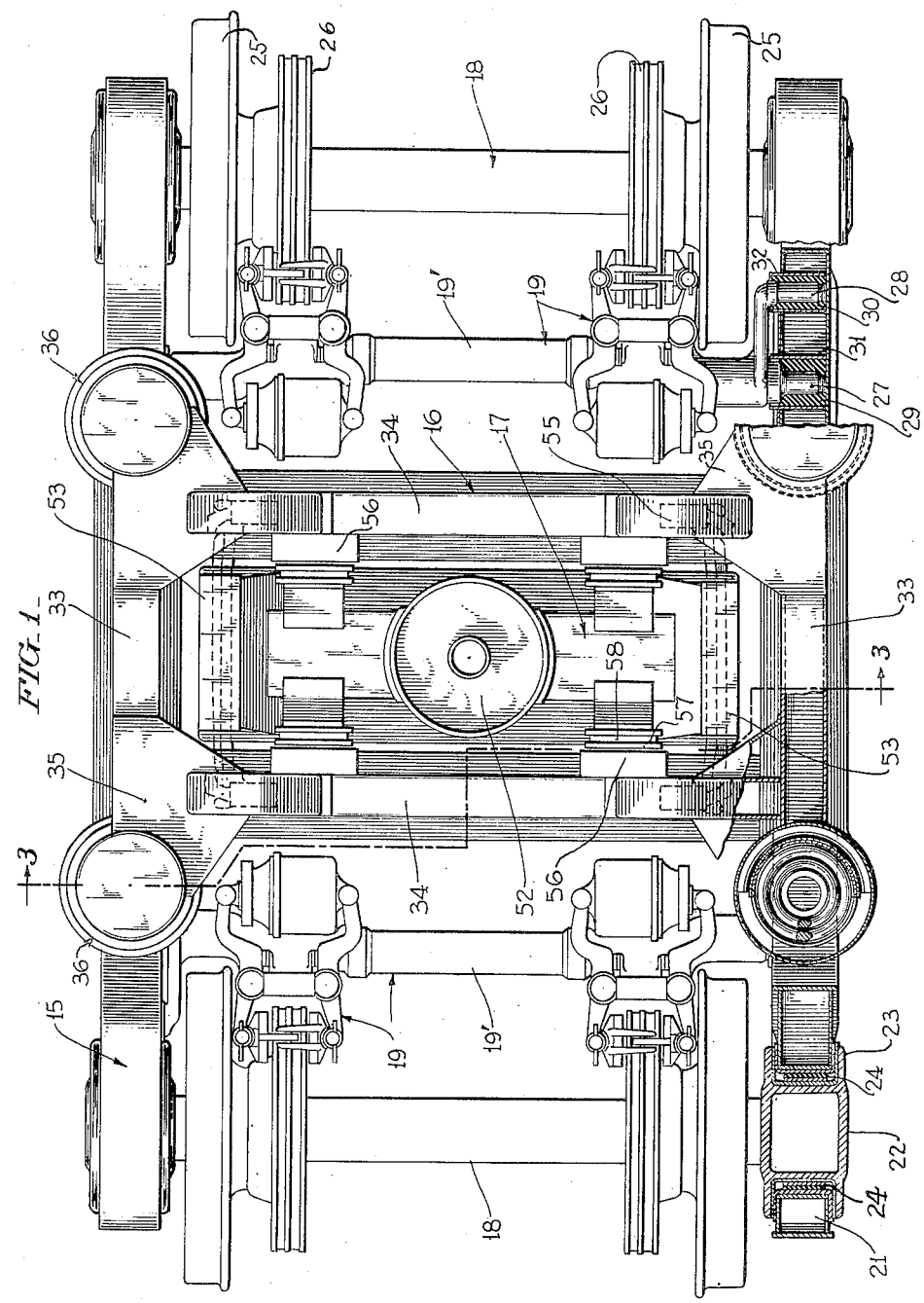
Figure 1 is a plan view of a truck built according to one embodiment of the invention, certain parts being shown in section substantially along line 1—1 of Figure 2.

The truck illustrated in Figures 1 to 4 comprises side frames or equalizers 15, a transverse frame or transom 16, a bolster 17, axles 18 and brake structures 19.

The side frames or equalizers 15 are of hollow box-sectional construction which may consist of sheet metal plates connected by welding. These side frames have a central, substantially straight horizontal portion 20 and pedestals 21 at their ends. The pedestals 21 receive the journal boxes 22 which have lateral flanges or wings 23 for limiting transverse movement between them and the side frames. Resilient cushions 24 are inserted between the journal boxes and the side frames so as to subdue high frequency vibrations. Members 21' removably bridge the pedestal openings.

The ends of the axles 18 are supported in the journal boxes 22 with no or but little transverse play. Rigidly secured to the axles 18 are the wheels 25 and brake discs 26.

The supporting beam 19' of the brake structure 19 is bifurcated at least at one end and the two arms 27, 28 are supported by rubber bushings 29, 30 in sleeves 31, 32 forming integral parts of the respective side frames. A similar rubber bushing support (not shown) may be provided for the other single end of each beam 19'. The remainder of the brake structure 19 will not be described because it does not constitute a part of the present invention. The brake supporting structure is disclosed and claimed in copending application Serial No. 574,892 filed January 27, 1945, entitled Brake Mechanism, now patent #2,423,694 issued July 8, 1947.

The transverse frame or transom 16 is composed of hollow section members, that is, in the embodiment of inverted channels. It is of generally rectangular form in plan and made up of longitudinal members 33 and transverse members 34. The longitudinal members 33 project beyond the transverse members 34. Corner brackets 35 secure the rigid connection between the members 33 and 34.

Welded to the four corners of the frame 16 are downwardly opening cylindrical housings 36. Coil springs 37, 38 are arranged in the interior of each housing 36 so that their upper ends abut the top wall 39 of the housing. The top wall plate 39 is provided with a cylindrical projection 40 fitting into the inner spring 38 and the upper portion 41 of the housing 36 is of such diameter as to fit rather closely around the outer spring 37, yet of course, with so much play as to accommodate the increase of diameter of the spring when it is compressed.

Lower spring seats 42 which are rigidly secured to the top walls of the side frames 15, each have a bottom wall 43 against which the lower ends of the springs 37, 38 rest, a central projecting portion 44 corresponding to the upper projection portion 40, and a cylindrical outer wall 45, the inner diameter of which is about equal to the inner diameter of the upper cylindrical portion 41 of the housing 36. The cylindrical wall 45 is substantially lower on one side than on the other side and its high portion has the outer surface covered with a wear plate 46 which may consist of high wear-resisting alloy. The high portion of the wall 45 is located on that side which faces toward the transverse vertical central plane of the truck and fits loosely into the widened middle portion 47 of the housing 36. The marginal portion 48 of the housing 36 is still further widened and is covered on its inside opposite the wall plate 46 with a strip-formed rubber cushion 49. The rubber cushion 49 has bonded to its opposite sides metal strips 50 and 51, respectively. The outer strip 50 serves for securing the cushion to the housing 36 such as by rivets 51'; these details are not shown in Figures 1 to 3 but only in Figure 4. The inner strip 51 consists again of a wear-resistant material.

The arrangement of the telescoping members 36 and 42 and their appertaining parts is such that contact will always occur between the metal strip 51 of the rubber cushion and the wear plate 46 without other parts of the telescoping members 36 and 42 making contact with each other. This fact is not clearly visible in the small-scale Figures 1 to 3 but the correct relations are shown in the large-scale Figure 4.

It will also be noted that the parts of the spring housings are the only ones which serve for transmitting horizontal forces between the transverse frame 16 and the side frames 15. The arrangement permits of slight canting movement which is necessary so as to allow unequal compression of the springs due to unequal loading of the car, to centrifugal forces or to angular movement of the car body with respect to the side frames about a transverse horizontal axis. In regard to the last mentioned angular movement it will become apparent from the following description that the bolster suspension is designed not to accommodate such angular movement.

The bolster 17 consists mainly of a hollow section transverse girder carrying the center plate 52 and provided at its ends with pedestals 53 for side bearings. The bolster is supported near its ends by hangers 54 which have their upper ends journalled at 55 to the transverse frame 16. Rubbing plates 56 and 57, rubber cushioned at 58 serve for the transmission of the longitudinal forces between bolster and transom.

It will be noted that the hanger suspension permits a limited transverse movement only but no tilting movement between the transverse frame 16 and the bolster 17 about a transverse axis. There are no spring plank and no springs between the hangers and the bolster as in many customary constructions of trucks for passenger cars.

The center plate 52 of the truck engages the center plate 59 secured to the body 59' (indicated by dot and dash lines), the arrangement being such that there is a fixed generally parallel relationship between the body and the bolster. The diameter of the center plates is such that the center plates will not separate on one side in case of eccentric stresses but the body and the center plates will move under all circumstances with the bolster and the transverse frame or transom except for the side sway permitted by the hanger suspension. It is evident that no pitching, galloping or rolling of any parts of the truck can occur because the side frames are firmly held to the rails and the remainder of the truck, i. e. transom, bolster and center plate, are held in fixed substantially parallel relationship to the car body.

From the foregoing description it will have become apparent that there are in this embodiment, except for the contact between the members 36 and 42 of the spring housings, no contacting surfaces, radius rods or any other of the conventional means for holding the side frames and the transverse frame together and for transmitting the horizontal forces. The result is a truck of extreme simplicity.

The desired result of great strength without heavy weight is in part attained by arranging the plane of transfer of the horizontal forces between the housings 36 and 42, that is, the rubber cushions 49, at about the level of the axles 18 and also close to the point of attachment of the lower member 42 to the side frames 15.

The general construction of the embodiment illustrated in Figures 5 to 10 has a great similarity to the general construction of the first embodiment.

The truck shown in Figures 5 to 10 has side frames 60, a transverse frame or transom 61, a bolster 62, a pair of axles 63 with wheels 64 and brake discs 65, brake supporting beams 66 supported, as clearly shown and described in patent #2,423,694 for Brake Mechanism granted July 8, 1947, by their single ends and their two-pronged ends 67, 68 and rubber bushings 69, 70 in the side frames 60 and axle boxes 71 held in the pedestals 72 of the side frames by wings 73 and rubber cushions 74 and 75. The rubber cushions are adhesively connected on both sides, as is customary, to metal plates which are secured to or engaged by the walls of the pedestals 72 and the outer surfaces of the journal boxes 71. The brake mechanisms supported by the beams 66 are not shown as they may be of any appropriate construction such as the construction illustrated in the first embodiment. The bolster 62 is provided with the center bearing 76 and with end brackets 77 for side bearings (not shown), and it is suspended from the frame or bolster 61 by hangers 78 in a similar manner as in the first embodiment. Spring devices or units 79 arranged at the four corners of the transom frame 61 support the latter on the side frames and hold the truck framework together as will become apparent from the following more detailed description of the spring units.

The side frames 60 are of closed box-sectional construction which is composed of a top plate 80, side plates 81, 82 and a bottom plate 83 welded together along their margins. The interiors of the pedestal openings are appropriately reinforced by additional plates and the openings are bridged by members 84 secured to the reinforcing plates by means, such as bolts (not shown). The transverse frame or transom 61 has two transverse members 85 and longitudinal members 86 likewise constituted by top and bottom plates 87, 88 and vertical walls 89, 90 which are welded together so as to form closed box-section girders.

The bolster 62 is in the form of a downwardly facing and laterally flanged channel closed at its ends by plates 91 which form part of the side bearing supports 77.

On each side of the truck is inserted a strut-type shock absorber 92 between a bracket 93 secured to the outside of the respective side frame 60 and a bracket 94 secured to the outside of the longitudinal member 86 of the transom 61. These shock absorbers serve for dampening the up and down movement of the body with the bolster 62 and the transom 61 relative to the side frames 60 and also to dampen oscillatory movements about a longitudinal axis.

A single lever-type shock absorber 95 is secured to one of the vertical walls of the bolster 62 in the interior thereof and has its arm 96 connected by link 97 to a bracket 98 which is secured to the inner side of one of the longitudinal members 86 of the transom. This shock absorber serves for dampening transverse swinging movement of the body with the bolster 62 relative to the transom 61. Of course, a shock absorber 95 might be provided at each end of the bolster 62 but in many cases the illustrated single shock absorber will suffice.

A rubber cushion 99 is secured to each of the end plates 91 of the bolster 62 opposite the bracket 98 on the one side and a similar plate 100 secured to the transom member 86 on the other side of the truck. These cushions resiliently limit the transverse movement of the bolster relative to the transom.

Each spring device or unit 79 has an upper spring housing 101 with a cup-shaped top portion 102 and a tubular lower portion 103. The top portion 102 has an apertured end wall 104 having two concentric portions 105 and 106 axially offset relative to each other. The outer annular portion 105 supports by means of a vibration damping ring 107 the outer spring 108, and the inner annular portion 106 supports the upper end of the inner spring 109 by a vibration absorbing ring 110. The housing portion 102 extends through an opening in the top plate 87 of the transverse frame 61, and its lower margin is outwardly flanged at 111 so as to rest against the underside of the top plate 87 and is firmly welded to the latter. The second housing portion 103 is welded to the underside of the top plate 87 and extends through an opening in the bottom plate 88 of the transverse frame 61 to the margin of which opening it is securely welded. The lower section 112 of the member 103 is greater than the diameter of the upper main portion and houses a rubber annulus 113 which, as indicated in the first embodiment has bonded to its cylindrical surfaces sheet metal rings 114 and 115 respectively. The ring 115 serves, as in the first embodiment, for securing the rubber annulus to marginal flange 116 of the housing whereas the inner ring 114 is of wear-resisting material.

Lower cup-shaped spring housing members 117 having a bottom wall 118 and a cylindrical wall 119 are firmly secured such as by ribs 120 and by welding to top wall 80 of the side frames or equalizers 60. The cylindrical wall 119 is covered all around with a plate 121 of wear-resisting material. The cylindrical members 119, 121 fit loosely into main part of the portion 103 of the upper housing 101 and with considerable less play into the ring 114 supported by the rubber 113.

Figure 10:
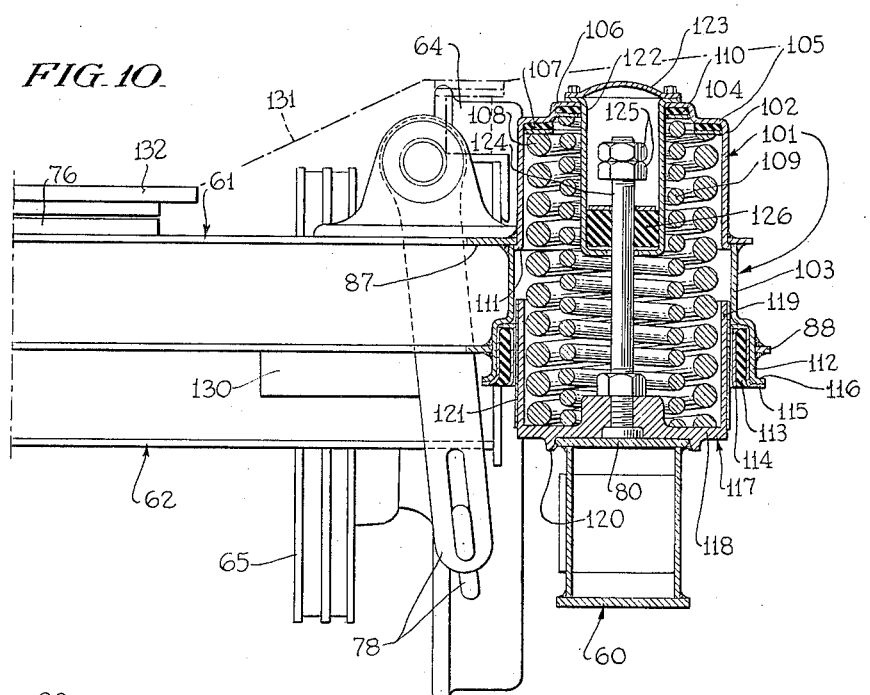
Figure 9:
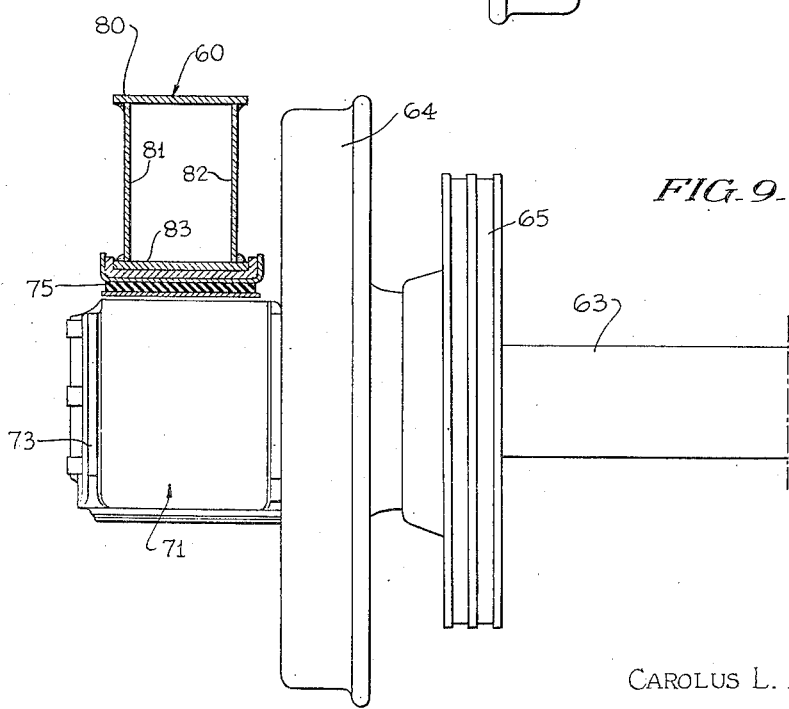

An upwardly open cup-shaped member 122 extends downwardly through the opening in the top wall 104 of the member 102 and may be closed by a removable lid 123. Through an aperture in the bottom wall of the member 122 extends a bolt 124 which is firmly screwed into the bottom wall 118 of the lower member 117 and is provided at its upper end with a pair of firmly tightened nuts 125. A resilient cushion 126 rests on the bottom wall of the member 122 and surrounds the bolt 124. This arrangement serves for resiliently limiting the upward movement of the transom and for holding the side frames 60 and the transom 61 together against the action of the springs when the truck is separated from and not weighed down by the car body. The parts are shown in Fig. 10 in the position of approximately normal loading.

Juxtaposed rubbing plates 127 and 128 are secured to the transom and bolster respectively. The plates 128 are attached by means of resilient cushions 129 to brackets 130 of the bolster. This generally conventional arrangement serves, as in the first embodiment, for resiliently transmitting the horizontal forces between bolster and transom without impeding the swinging transverse movement of the bolster relative to the transom.

The body 131 (indicated by dot and dash lines) with its fixed center plate 132 is held also in the second embodiment in fixed parallel relationship to the center plate of the truck and to the bolster and transom thereof, substantially in the same manner and for the same purposes as has been explained at length in connection with the first embodiment.

It may be emphasized here that the maintenance of the fixed relationship of all spring supported parts of the truck to the car body, while permitting a certain amount of side sway, may be adapted for other types of trucks such as for instance trucks having a main frame extending over the entire width of the body or to trucks having a framework spring supported on the axle boxes.

The invention is not restricted to the illustrated embodiments but modifications will occur to those skilled in the art. Other means than those illustrated in detail may be used for transmitting the horizontal forces from one housing member to the other such as, for instance, a rubber ring secured to both members and having enough elasticity in vertical direction to permit the up and down movement of the members. It is also obvious that rubber cushions may be dispensed with and the horizontal forces transmitted directly from one housing part to the other or through portions rigidly connected with them. In regard to the illustrated spring device and to other details of the illustrated embodiments it will also be apparent that they may be used for other purposes than the specific trucks for which they were developed. Such modifications and adaptations of the invention or its details are intended to be covered by the language and the spirit of the attached claims.

What is claimed is:

1. A rail car truck comprising an independent side frame or equalizer on each side, two pairs of wheels supporting the side frames near their ends, a transverse frame or transom arranged in longitudinal direction between the wheels and extending in transverse direction from side frame to side frame, and spring devices on each side of the truck between the four corners of the transverse frame and the side frames, said spring devices comprising generally cylindrical telescoping members enclosing coil springs, said members being rigidly secured to the side frames and the transverse frame respectively and serving, through the engagement of their cylindrical surfaces, substantially as the sole means for holding the central portions of the two side frames together and for transmitting horizontal forces between the side frames and the transverse frame, an amount of play being designedly provided between said telescoping members sufficient to allow tilting of the transom with respect to the side frames or equalizers about horizontal transverse and longitudinal axes without binding between said members.

2. In a rail car truck: side frames or equalizers supported by wheels at their ends; a transverse frame or transom arranged in longitudinal direction between the wheels and extending in transverse direction from side frame to side frame; spring devices on each side of the truck between the side frames and the ends of the transverse frame, said spring devices comprising coil springs and housings with telescoping members enclosing the associated coil springs and rigidly secured to the side frames and the transverse frame respectively and serving for transmitting horizontal forces between the side frames and the transverse frame, a rubber cushion being secured on one side to one of the housing members and provided with a rigid facing such as metal on the other side which faces the other housing member, said facing being slidable with respect to the other housing member, whereby the rubber cushion comes into play in cushioning said horizontal forces and in restraining tilting of the transom with respect to said side frames or equalizers about horizontal transverse and longitudinal axes, but has no effect on the vertical springing action of said coil springs.

CAROLUS L. EKSERGIAN.

REFERENCES CITED

The following references are of record in the file of this patent:

UNITED STATES PATENTS

| Number | Name | Date |
|---|---|---|
| 1,387,158 | Leitch | Aug. 9, 1921 |
| 1,408,321 | Wellman | Feb. 28, 1922 |
| 1,739,123 | Bruce | Dec. 10, 1929 |
| 1,990,638 | Davidson | Feb. 12, 1935 |
| 2,047,251 | Bender | July 14, 1936 |
| 2,064,464 | Darby | Dec. 15, 1936 |
| 2,184,102 | Piron | Dec. 19, 1939 |
| 2,205,586 | Williams | June 25, 1940 |
| 2,207,848 | Barrows | July 16, 1940 |
| 2,231,195 | Piron | Feb. 11, 1941 |
| 2,242,852 | Flowers | May 20, 1941 |
| 2,265,392 | Olander | Dec. 9, 1941 |
| 2,354,309 | Frede | July 25, 1944 |